United States Patent [19]

Precht

[11] Patent Number: 4,986,171
[45] Date of Patent: Jan. 22, 1991

[54] DEVICE FOR REINFORCING LIQUID-DISPENSING CONTAINERS IN APPARATUS FOR MAKING HOT BEVERAGES

[75] Inventor: Hans-Jürgen Precht, Solingen, Fed. Rep. of Germany

[73] Assignee: Robert KRUPS Stiftung & Co. KG, Solingen, Fed. Rep. of Germany

[21] Appl. No.: 315,458

[22] Filed: Feb. 23, 1989

[30] Foreign Application Priority Data

Feb. 26, 1988 [DE] Fed. Rep. of Germany ....... 3806113

[51] Int. Cl.$^5$ ............................................. A47J 31/00
[52] U.S. Cl. ......................................... 99/279; 99/295
[58] Field of Search ...................... 99/279, 285, 289 R, 99/291, 300, 304, 306, 310, 316, 323, 646 C, 295; 366/242, 244, 245, 247, 249, 281, 282, 129, 130, 347; 220/73, 75, 85 CH; 206/0.5; 426/433

[56] References Cited

U.S. PATENT DOCUMENTS

| | | | |
|---|---|---|---|
| 907,790 | 1/1869 | Simpson | 99/316 |
| 1,683,034 | 9/1928 | Horlick, Jr. | 220/75 |
| 1,849,400 | 3/1932 | Fisher | 220/73 |
| 2,123,600 | 7/1938 | Galante | 366/247 |
| 2,517,648 | 8/1950 | Franke | 366/347 |
| 2,618,143 | 11/1952 | McConaughy | 366/130 |
| 3,182,584 | 5/1965 | Serio | 99/310 |
| 3,385,201 | 5/1968 | Martin | 99/295 |
| 3,587,444 | 6/1971 | Godel | 99/300 |
| 3,677,524 | 7/1972 | Douglas | 366/130 |
| 3,971,304 | 7/1976 | Cvitkovich | 99/316 |
| 4,208,958 | 6/1980 | Petry | 99/300 |
| 4,459,524 | 7/1984 | Oota et al. | 99/285 |
| 4,488,817 | 12/1984 | Uesaka et al. | 366/247 |
| 4,530,442 | 7/1985 | Vogel, Jr. | 220/73 |
| 4,572,060 | 2/1986 | Yung-Kwan | 99/289 R |
| 4,682,705 | 7/1987 | Horwitz | 366/130 |

Primary Examiner—Robert W. Jenkins
Attorney, Agent, or Firm—Peter K. Kontler

[57] ABSTRACT

A coffee brewing apparatus wherein the housing supports a thin-walled container for fresh water. The container has an open top and a marginal portion which surrounds the open top and carries a reinforcing frame which supports a closure having one or more pivotable lids serving to expose or close the open top of the container. A downwardly extending portion of the frame can be inserted into or can surround the marginal portion of the container, a horizontal flange-like second portion of the frame serves as a rest for the lid or lids of the closure, and a third portion of the frame integrally connects the first and second portions and surrounds the closure. The third portion of the frame has bearings for one or more pintles connecting the lid or lids of the closure to the frame. The combined thickness of marginal portion of the container and first portion of the frame equals or approximates the thickness of third portion of the frame and/or the thickness of major portion of the container.

15 Claims, 1 Drawing Sheet

DEVICE FOR REINFORCING LIQUID-DISPENSING CONTAINERS IN APPARATUS FOR MAKING HOT BEVERAGES

BACKGROUND OF THE INVENTION

The invention relates to improvements in apparatus for making hot beverages, such as chocolate, coffee and tea. More particularly, the invention relates to improvements in apparatus of the type wherein an open-top container for temporary storage of a liquid (such as milk or fresh water) is carried by a housing and serves to dispense its contents at a desired rate so that the dispensed liquid can be heated prior to contacting an aromatic substance, for example, tea leaves, comminuted coffee beans or pulverulent chocolate. The invention will be described with reference to a coffee making apparatus but it is to be understood that the invention can be embodied with equal or similar advantage in apparatus for making tea or other hot beverages.

It is known to provide a coffee making apparatus with a hollow housing which serves to confine an electric water heater and many other components of electric circuitry. The housing further serves as a support or includes a container for cold fresh water which is caused to flow through the heating unit to be heated to proper temperature prior to contacting comminuted coffee beans in a filter holder. The latter can be mounted on the housing or is placed on top of a coffee pot which gathers freshly brewed coffee and rests on a heater or warming plate so that the supply of freshly brewed coffee is maintained at an optimum temperature. Coffee brewing apparatus wherein the filter holder is supported by the housing are manufactured by the assignee of the present application in a variety of forms and sizes and include those known as "Coffee Time", "Coffee Aroma", "Euro/Brew Aroma" and "Euro/Brew Signal". The assignee of the present application further produces a variety of apparatus wherein the filter holder is placed directly on top of the coffee pot. Certain apparatus of such character are known as "Brewmaster", "Brewmaster II" and "Brewmaster Jr.".

As a rule, the container of a coffee making apparatus has an open top which can be closed by a pivotable or otherwise movable lid and is exposed prior to refilling the container whenever the supply of liquid in the container is exhausted or nearly exhausted. The container is reinforced in the region of the open top. Such reinforcement forms an integral part of the container and can constitute an outwardly extending portion of the container wall in the region of the open top. The outwardly extending portion resembles a flange which can be disposed at right angles to the adjacent major portion of the container wall or is curved to be provided with a convex upper side. A drawback of such containers is that they are rather expensive, mainly because they must be produced in complex forms. Moreover, an integral reinforcement is satisfactory only if the wall of the container is relatively thick. In other words, the container must be heavy because its wall thickness cannot be reduced at will without unduly weakening the reinforcing flange around its open top.

It was further proposed to install a separately produced closure or lid in a support which is placed on top of the container in a coffee brewing apparatus. The support is separable from the container and the lid is separable from the support.

OBJECTS OF THE INVENTION

An object of the invention is to provide a novel and improved reinforcement for the open top of a container for use in an apparatus for making hot beverages, such as coffee, tea or chocolate.

Another object of the invention is to provide a container which can be used in conjunction with the above outlined reinforcement.

A further object of the invention is to provide an apparatus which embodies the above outlined container and its reinforcement.

An additional object of the invention is to provide a novel and improved frame which can be used as a reinforcement for open-top of containers in apparatus for making hot beverages.

Still another object of the invention is to provide a novel and improved method of mounting the frame on the container.

Another object of the invention is to provide a reinforcing frame which renders it possible to greatly reduce the wall thickness of the container without unduly affecting its ability to resist deformation.

A further object of the invention is to provide a simple, compact and inexpensive frame which contributes to the eye-pleasing appeal of the container as well as to the appearance of the entire apparatus.

An additional object of the invention is to provide a frame which renders it possible to greatly reduce the quantity of material which is used to make the container, which renders it possible to simplify the form in which the container is produced, and which renders it possible to dispense with a flange at the top of the container.

A further object of the invention is to provide a novel and improved combination of reinforcing means and closure for use in the improved apparatus.

Another object of the invention is to provide a novel and improved closure for use on top of the container in the above outlined apparatus.

An additional object of the invention is to provide novel and improved means for connecting the closure to the reinforcing means.

SUMMARY OF THE INVENTION

The invention is embodied in an apparatus for making hot beverages, such as coffee or tea. The improved apparatus comprises a preferably hollow housing, and a liquid-dispensing container which is carried by the housing (such container can serve to confine a supply of fresh water and can be removably installed in or can form part of the housing). The container has an open top and a marginal portion which surrounds the open top, and the apparatus further comprises means for reinforcing the container in the region of the open top. The reinforcing means comprises a preferably annular frame (which may but need not be circular or nearly circular) which surrounds the open top of the container and is carried by the marginal portion. The frame preferably constitutes a separately produced part which is permanently or separably affixed to the marginal portion of the container.

The apparatus preferably further comprises a closure for the open top of the container, and means for movably connecting the closure to the frame. The closure preferably includes at least one lid, and the connecting means can comprise at least one hinge which pivotally connects the at least one lid to the frame, preferably in such a way that the at least one lid is pivotable through approximately 180°. In accordance with a presently preferred embodiment, the closure comprises a plurality of lids and the connecting means then preferably comprises several hinges, one for each lid and each pivotally connecting the respective lid to the frame. If the closure comprises two lids, the hinge or hinges are preferably designed in such a way that the two lids are alternately pivotable through angles of approximately 180°.

The frame preferably includes a first portion which engages the marginal portion of the container, and a second portion which supports the closure. A third portion of the frame preferably serves to connect the first and second portions to each other. The third portion of the frame can be provided with a convex outer side and a second side which is or can be located opposite the outer side. The connecting means is disposed at the second side of third portion of the frame. The second side preferably surrounds the closure. The second portion of the frame can include a substantially horizontal annular flange which is surrounded by the third portion and constitutes a rest for the closure. The third portion of the frame can include a substantially vertical annular section which is rigid with and extends upwardly from the flange.

The frame can be provided with a shoulder which rests on the marginal portion of the container. Such shoulder can be disposed between the first and third portions of the frame. The thickness of the third portion of the frame can equal or approximate the combined thickness of the marginal portion of the container and the first portion of the frame. If the major portion of the container is thicker than the marginal portion, the combined thickness of the marginal portion of the container and of the first portion of the frame can equal or approximate the thickness of main portion of the container.

The marginal portion of the container can surround the first portion of the frame, or vice versa.

The novel features which are considered as characteristic of the invention are set forth in particular in the appended claims The improved apparatus itself, however, both as to its construction and the mode of assembling the same, together with additional features and advantages thereof, will be best understood upon perusal of the following detailed description of certain specific embodiments with reference to the accompanying drawing.

DESCRIPTION OF PREFERRED EMBODIMENTS

Figure 1:
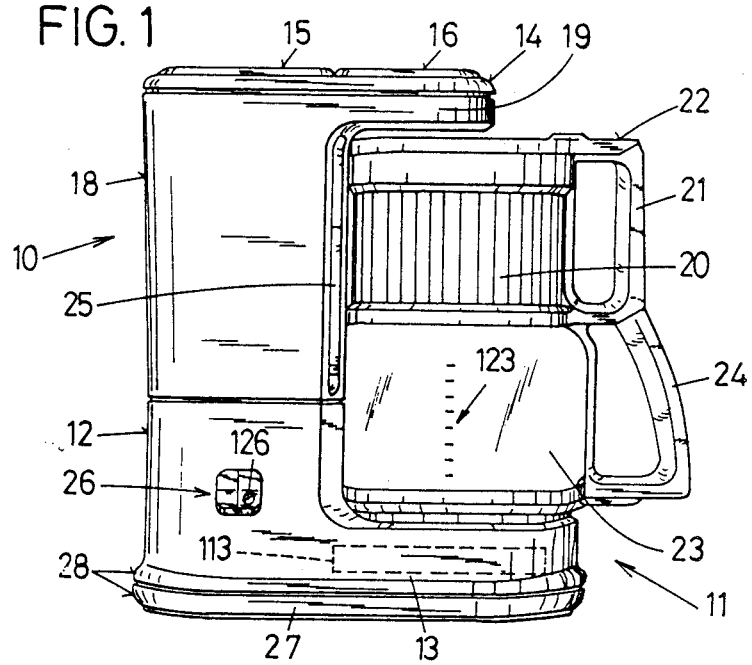
FIG. 1 is an elevational view of an apparatus with a novel container and with novel means for reinforcing the container in the region of its open top.

The drawing shows only those parts of the improved apparatus, of the improved container, of the novel reinforcing means and of the novel closure which are necessary for full understanding of the invention. For example, the drawing does not show the majority of electric parts of the apparatus, the details of the filter holder, the details of the heating unit, the details of the means for conveying liquid from the container, through the heating unit and into the filter holder, and/or the details of means for maintaining the contents of the beverage collecting vessel at an optimum temperature As such parts are or can be identical with those in existing apparatus of the assignee of the present application.

FIG. 1 shows a coffee making apparatus 10 which comprises a hollow substantially L-shaped housing 11 having a relatively long horizontal lower section or leg 13 and a relatively short upright section or leg 12. The housing 11 is made of a suitable plastic material and supports and/or confines the electrical components of the apparatus lo including an electric heating unit 113 which is installed in the horizontal section 13 and an on/off switch 26 on the upright section 12. The underside of the section 13 is open and overlaps a bottom wall 27 which is detachably or permanently connected to the housing. The connection between the bottom wall 27 and the lower section 13 of the housing 11 can include complementary male and female detent elements (e.g., resilient pallets which can snap into sockets) which permit rapid attachment of the bottom wall 27 to or rapid separation of such bottom wall from the housing 11. The lowermost portion of the housing section 13 is reinforced, the same as the adjacent portion of the bottom wall 27. Such reinforcements are denoted by the character 28, and each such reinforcement can include a circumferentially complete bead which is integral with the section 13 and bottom wall 27, respectively. The aforementioned male and female detent means can form part of the reinforcements 28.

A liquid-dispensing container 18 is carried by the short upright section 12 of the housing 11. For example, the bottom portion of the container 18 can be provided with a downwardly projecting skirt which surrounds the top portion of the section 12 or vice versa. This renders it possible to detach the container 18 from the housing 11 for the purposes of cleaning, inspection or replacement. The aforementioned connection including a skirt can be replaced with other types of connections, e.g., with sets of cooperating male and female detent elements, as long as the selected connection ensures reliable attachment of the container 18 to the section 12 of the housing 11 and as long as the selected connection ensures that an outlet (not shown) in the bottom portion of the container 18 can admit liquid into a conduit (not specifically shown) which conveys the liquid through the heating unit 113 in the housing section 13 and thereupon into a customary riser which conveys heated liquid into the topmost portion of the container 18 for admission into a filter holder 20. The heating unit 113 is preferably designed in such a way that it surrounds a selected portion of the aforementioned conduit and thus heats the stream of liquid flowing from the container 18 toward the filter holder 20 Heating units of such type are disclosed in numerous United States and foreign patent applications and in numerous United States and foreign patents of the assignee of the present application. The aforementioned riser can extend through the container 18 and has a horizontal top part in the container portion 19 with an outlet above the filter holder 20.

The container 18 is a hollow inverted L-shaped body which is made of suitable plastic material and includes the aforementioned relatively thin top portion 19 extending above the filter holder 20, and an upright main portion 18a above the housing section 12. The top of the container 18 is open (see FIG. 3) and is surrounded by a relatively thin circumferentially complete marginal portion 34. The filter holder 20 has a detachable top wall 22 with an opening for admission of hot liquid from the outlet of the riser in the top portion 19 of the container 18, and a handle 21. This filter holder confines an expendable filter which is made of paper or the like and serves to receive a metered quantity of an aromatic agent, e.g., a supply of powdered coffee beans.

The filter holder 20 rests on top of a vessel 23 which is preferably made of heat-resistant glass or other light-transmitting material and rests on a warming plate of the housing section 13. The body of the vessel 23 is provided with graduations 123 denoting the number of cups which can be filled with the contents of the vessel. The graduations 123 can be provided next to numerals or next to miniature images of cups, i.e., a single cup next to the lowermost graduation, two cups next to the second lowermost graduation, and so forth The bottom wall of the filter holder 20 has an outlet above the open top of the vessel 23 so that the freshly brewed beverage which has passed through the filter can flow into and gathers in the interior of the vessel. The warming plate maintains the contents of the vessel 23 at a desired temperature. The vessel 23 is provided with a handle 24 for convenient manipulation with or independently of the filter holder 20. The aforementioned warming plate is preferably recessed into the top wall of the housing section 13. The latter can be provided with a shallow depression to facilitate placing of bottom wall of the vessel 23 onto the warming plate.

The housing section 12 can further support a signal generating device 126, e.g., a light source, which generates a signal when the switch 26 is moved to operative position in which the heating unit 113 is connected with a source of electrical energy to heat the stream of liquid flowing from the outlet of the container 18 toward and into the filter holder 20. The illustrated signal generating device 126 is mounted on or in the switch 26.

The container 18 supports a liquid level indicator 25 here shown as an upright tube having a lower end portion in communication with the lower portion of the container so that the liquid level in the indicator matches that in the container. A presently preferred water level indicator is disclosed in commonly owned copending patent application Ser. No. 315,456 filed Feb. 23, 1989 by Hans-Jürgen Precht and Klaus Beumer for "Liquid Level Indicator".

Figure 2:
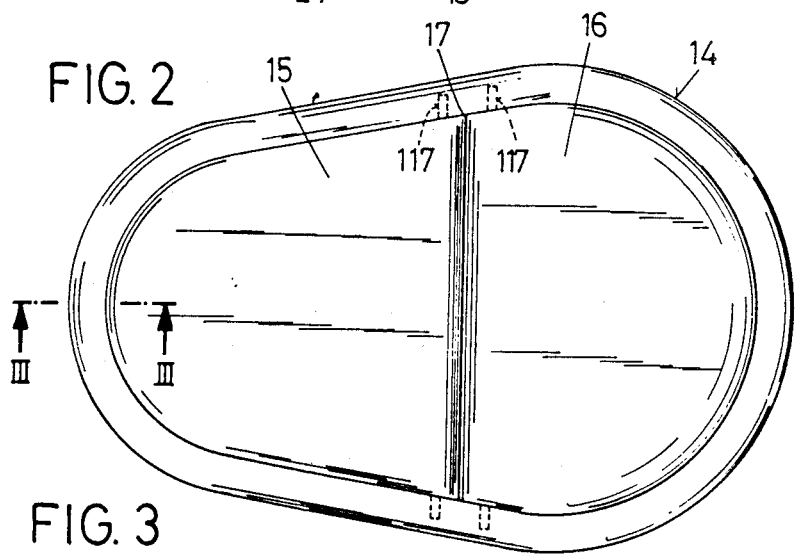
FIG. 2 is an enlarged plan view of the reinforcing means and of the closure which is affixed to the reinforcing means.
Figure 3:
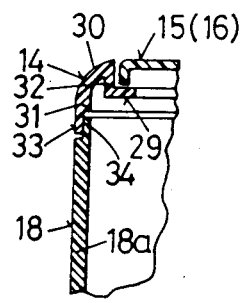
FIG. 3 is a fragmentary sectional view of the reinforcing means and closure and of a portion of the container, substantially as seen in the direction of arrows from the line III—III of FIG. 2.

The major or main portion 18a of the container 18 is relatively thin with resulting savings in material Moreover, the container 18 can be produced in a simple form because its marginal portion 34 around the open top need not extend outwardly. This is due to the fact that the apparatus 10 is provided with a separately produced reinforcing device in the form of an endless frame 14 which is applied over the marginal portion 34 and carries a closure including two pivotable lids 15, 16 which normally overlie the open top of the container 18. The frame 14 includes a first portion 33 which extends downwardly from an internal shoulder 31 and surrounds the marginal portion 34. The shoulder 31 overlies the top end face of the marginal portion 34 and is disposed at a level beneath a flange-like second portion 29 of the frame 14. The portion 29 is substantially horizontal and serves as a rest for the lids 15, 16 of the closure when such lids assume their closed positions which are shown in FIGS. 1, 2 and 3. A third portion 30 of the frame 14 connects the first portion 33 with the second portion 29 and has a convex outer side facing away from the flange 29 and disposed substantially opposite a substantially vertical second or inner side provided on a vertical section 32 of portion 30 and surrounding the lids 15 and 16. The shoulder 31 is located between the first and third portions 33, 30 of the frame 14.

The combined thickness of first portion 33 of the frame 14 and marginal portion 34 of the container 18 equals or approximates the thickness of the third portion 30 as well as the thickness of the major portion 18a of the container 18. Such design of the container 18 and frame 14 is desirable and advantageous because the frame does not project laterally outwardly beyond the container and vice versa. In other words, there is a smooth transition between the outer side of major portion 18a of the container 18 and the convex outer side of third portion 30 of the frame 14.

Figure 4:
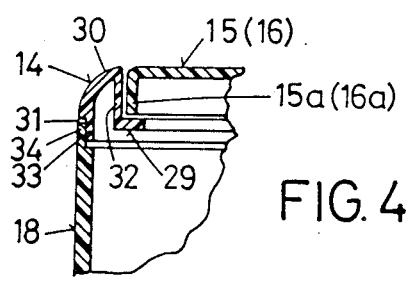
FIG. 4 is a similar fragmentary sectional view but showing a portion of a modified container and a portion of modified reinforcing means for the container in the region of its open top.

The structure which is shown in FIG. 4 differs from the structure of FIG. 3 merely in that the marginal portion 34 of the container 18 surrounds the first portion 33 of the frame 14. The transition from the outer side of the major portion 18a to the convex outer side of the third portion 30 of the frame 14 is or can be as smooth as that shown in FIG. 3. The combined thickness of marginal portion 34 of the container 18 and first portion 33 of the frame 14 again matches or approximates the thickness of third portion 30 or the thickness of major portion 18a.

The first portion 33 of the frame 14 can be simply slipped into or onto (around) the marginal portion 34 of the container 18 so that the frame 14 is held in proper position as a result of frictional engagement between the parts 33 and 34. However, it is equally possible to permanently bond the first portion 33 of the frame 14 to marginal portion 34 of the container 18 or to provide male and female detent elements for releasably holding the frame 14 in proper position in which the shoulder 31 rests on top of the marginal portion 34. Bonding can be achieved by employing a suitable adhesive or by welding the first portion 33 of the frame 14 to marginal portion 34 of the container 18. It has been found that, in most or many instances, a relatively strong frictional engagement between the portions 33, 34 suffices to ensure proper retention of frame 14 in an optimum position with reference to the container 18 the marginal portion 34 of which is adequately reinforced even if the major portion 18a is relatively thin. If the connection between the container 18 and the frame 14 includes male and female detent elements (e.g., in the form of hooks on one of the portions 33, 34 and recesses or sockets for the hooks on the other portion), such male and female detent elements are preferably integral parts of the marginal portion 34 of the container 18 and first portion 33 of the frame 14 or vice versa. A separable connection is preferred in many instances because it renders it possible to salvage the frame 14 and the lids 15, 16 if the container 18 is damaged beyond repair or the other way around.

In accordance with a presently preferred embodiment, the lids 15, 16 of the two-piece closure for the open top of the container 18 are assembled with the frame 14 before the latter is separably or permanently attached to the marginal portion 34 of the container. The means for movably connecting the lids 15, 16 to the frame 14 preferably comprises one or more hinges 17 which are designed in such a way that each lid is pivotable through approximately 180° between a closed and a fully open position. The lid 15 can be pivoted to open position when the lid 16 is at least partially closed, and the lid 16 can be pivoted to open position when the lid 15 is at least partially closed. FIG. 2 shows the end portions 117 of two parallel pintles forming part of two discrete hinges, one for each of the lids 15, 16. The end portions 117 are received in bearings having holes provided at the inner side of third portion 30 of the frame 14, namely in the vertical section 32 of third portion 30. The pintles extend through downwardly extending marginal portions 15a, 16a of the respective lids.

It is possible to replace the illustrated closure having two discrete lids 15, 16 with a closure having a single lid which is pivotably or otherwise connected to the frame 14 for movement between open and closed positions.

The lid 15 is lifted prior to admission of fresh liquid into the container 18, and the lid 16 is lifted to permit inspection of the aforementioned horizontal portion of the riser which supplies heated liquid to the filter holder 20. An advantage of a one-piece closure is that the connecting means for such closure requires a single hinge, it being assumed that the one-piece closure is pivotally connected to the frame 14.

If desired, the color of the frame 14 and/or closure can depart from the color of the container 18 and/or filter holder 20. This might contribute to the eye-pleasing appeal of the apparatus 10 and/or serve to distinguish different types of apparatus from each other.

The improved apparatus can be modified in a number of ways without departing from the spirit of the invention. For example, the outline of the frame 14 can resemble or constitute a circle or a polygon. Furthermore, the cross-sectional configuration of the frame (which can be made of a metallic or plastic material) can depart from that shown in FIG. 3 or 4. The same applies for the configuration of the container 18. The improved container and the reinforcing device 14 therefor can be used in a number of different coffee making, tea making or other apparatus for making hot beverages.

An important advantage of the improved apparatus is that it can employ a simple, lightweight and inexpensive container. This is due to the fact that the means for reinforcing the container in the region of its open top need not form an integral part of the container but can be a separately produced frame which is assembled with one or more pivotable or otherwise movable lids prior to attachment to marginal portion 34 of the container. As mentioned above, the improved container can be mass produced at a fraction of the cost of heretofore known containers because it can constitute a thin-walled body and need not be provided with integral reinforcing means. This also permits a simplification of the form or mold in which the container is produced, e.g., in an extruding or injection molding machine. It has been found that the aforedescribed frame 14 or an equivalent reinforcing device can adequately stiffen a lightweight thin-walled container in the region of its marginal portion so that the combination of improved container and improved frame can stand pronounced deforming stresses, at the very least those stresses which are expected to arise when the container is in use in a coffee making, tea making or like apparatus. The just mentioned container-frame combination has been found to successfully resist pronounced deforming forces which are applied to the major portion 18a of the container.

The making of frame 14 as a separately produced part and the assembling of frame 14 with a closure having one or more lids into a unit which is ready to be slipped onto or otherwise separably or permanently affixed to the marginal portion 34 also contributes to lower manufacturing and assembly cost of the apparatus. The preferably permanent connection between the frame 14 and the closure is desirable and advantageous because this ensures that the lid or lids cannot be misplaced when the container is cleaned, jointly with or independently of the frame 14. It will be noted that the improved frame performs a number of important functions, namely enhancing the appearance of the container 18 and of the entire apparatus 10, reinforcing a thin-walled and lightweight container in the region of its open top, carrying the lid or lids of the closure, preventing separation of the lid or lids and enabling the lid or lids to pivot between spaced-apart closed and fully open positions, e.g., through angle(s) of close to 180°.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should are are intended to be comprehended within the meaning and range of equivalence of the appended claims.

I claim:

1. Apparatus for making hot beverages, such as coffee or tea, comprising a housing; a liquid-dispensing container carried by said housing, said container having an open top and a marginal portion surrounding said open top; means for reinforcing said container in the region of said open top, including a separately produced frame surrounding said open top and carried by said marginal portion; a closure for said open top; and means for movably connecting said closure to said frame, said closure including at least one lid and said connecting means including a hinge pivotally connecting said at least one lid to said frame.

2. The apparatus of claim 1, wherein said closure comprises a plurality of lids and said connecting means comprises hinges, one for each of said lids and each pivotally connecting the respective lid to said frame.

3. The apparatus of claim 1, wherein said hinge has means for pivotally connecting said closure to said frame for angular movement through approximately 180°.

4. The apparatus of claim 1, wherein said closure comprises two lids and said hinge has means for pivotally mounting said lids on said frame so that the lids are alternately pivotable through angles of approximately 180°.

5. The apparatus of claim 1, wherein said frame includes a first portion which engages said marginal portion and a second portion which supports said closure.

6. The apparatus of claim 5, wherein said frame further comprises a third portion connecting said first and second portions and supporting said connecting means.

7. The apparatus of claim 6, wherein said third portion has a convex outer side and a second side, said connecting means being disposed at the second side of said third portion.

8. The apparatus of claim 7 wherein said second side is located substantially opposite said outer side and surrounds said closure.

9. The apparatus of claim 6, wherein said second portion includes a flange which is surrounded by said third portion and constitutes a rest for said closure.

10. The apparatus of claim 9, wherein said flange is substantially horizontal and said third portion includes a substantially vertical annular section rigid with and extending upwardly from said flange.

11. The apparatus of claim 6, wherein said frame has a shoulder which rests on said marginal portion.

12. The apparatus of claim 11, wherein said third portion has a predetermined thickness and the combined thickness of said marginal portion and said first portion equals or approximates said predetermined thickness.

13. The apparatus of claim 5, wherein said container further includes a main portion having a predetermined thickness, the combined thickness of said marginal portion and said first portion being equal to or approximating said predetermined thickness.

14. The apparatus of claim 5, wherein said first portion surrounds said marginal portion.

15. The apparatus of claim 5, wherein said marginal portion surrounds said first portion.

* * * * *